(12) United States Patent
Soskind

(10) Patent No.: US 7,133,136 B2
(45) Date of Patent: Nov. 7, 2006

(54) WAVELENGTH MONITOR

(75) Inventor: Yakov G. Soskind, Plainsboro, NJ (US)

(73) Assignee: JDS Uniphase Corporation, Milpitas, CA (US)

( * ) Notice: Subject to any disclaimer, the term of this patent is extended or adjusted under 35 U.S.C. 154(b) by 265 days.

(21) Appl. No.: 10/961,279

(22) Filed: Oct. 8, 2004

(65) Prior Publication Data

US 2005/0088658 A1     Apr. 28, 2005

Related U.S. Application Data

(60) Provisional application No. 60/513,505, filed on Oct. 22, 2003.

(51) Int. Cl.
*G01B 9/02* (2006.01)

(52) U.S. Cl. .................. 356/454; 356/519

(58) Field of Classification Search ............. 356/450, 356/454, 480, 519; 372/28, 29.012, 29.021, 372/32
See application file for complete search history.

(56) References Cited

U.S. PATENT DOCUMENTS

| | | | |
|---|---|---|---|
| 4,309,671 A | 1/1982 | Malyon | 331/94.5 |
| 5,825,792 A | 10/1998 | Villeneuve et al. | 372/32 |
| 6,005,995 A | 12/1999 | Chen et al. | 385/24 |
| 6,122,301 A | 9/2000 | Tei et al. | 372/32 |
| 6,144,025 A | 11/2000 | Tei et al. | 250/226 |
| 6,411,634 B1 | 6/2002 | Zhang et al. | 372/32 |
| 6,549,548 B1 | 4/2003 | Kuznetsov et al. | 372/32 |
| 6,587,214 B1 * | 7/2003 | Munks | 356/519 |
| 6,621,580 B1 * | 9/2003 | Myatt et al. | 356/519 |
| 7,038,782 B1 * | 5/2006 | Hedin et al. | 356/454 |
| 7,075,656 B1 * | 7/2006 | Hedin | 356/454 |
| 2003/0063871 A1 | 4/2003 | Yabe et al. | 385/88 |

* cited by examiner

*Primary Examiner*—Gregory J. Toatley, Jr.
*Assistant Examiner*—Michael A. Lyons
(74) *Attorney, Agent, or Firm*—Allen, Dyer, Doppelt, Milbrath & Gilchrist, P.A.

(57) ABSTRACT

A wavelength monitoring device for monitoring a beam of light is disclosed having a beam splitter, with opposing first and second spaced apart faces, for receiving optical radiation from the beam of light to be monitored. In operation the first face reflects a first portion of the optical radiation to a first photodiode. The second face includes a grating for reflecting a second portion of the optical radiation to the first photodiode. The grating also reflects a third portion of optical radiation to a second photodiode. The light received by the second photodiode corresponds proportionally to optical power of the incident beam of light. The first photodiode is for detecting a wavelength characteristic of the composite beam and is located so as to receive the first portion and the second portion of optical radiation after the first portion and the second portion of optical radiation have optically interfered to form a composite beam. The first face and the grating are oriented and spaced from one another so that the first and second portions of the optical radiation optically interfere with one another along a path toward the first photodiode.

19 Claims, 7 Drawing Sheets

WAVELENGTH MONITOR

CROSS-REFERENCE TO RELATED APPLICATIONS

This application claims priority of U.S. Provisional Patent Application No. 60/513,505 filed Oct. 22, 2003, entitled "Laser Wavelength Locker System", which is incorporated herein by reference for all purposes.

FIELD OF THE INVENTION

The present invention relates to wavelength monitoring and control devices. More specifically, it relates to a wavelength locker that is used to precisely maintain the operating wavelength or frequency of a laser.

BACKGROUND OF THE INVENTION

With the growth of optical communication systems, the need for laser sources operating at well defined spectral frequencies or wavelengths has arisen. Wavelength Division Multiplexing (WDM) systems employ several laser systems, each of them modulated at a unique working wavelength. The modulated optical signals are subsequently multiplexed, and spectrally separated channels are combined and delivered through one or more optical fibers. At a receiver end the channels are separated by way of their wavelengths being demultiplexed and routed to individual detectors.

Although WDM systems significantly increase the capacity of a single optical fiber, it comes at a price; control of the wavelength accuracy of each individual laser source must be maintained. Any significant wavelength drift of any channel will cause signal degradation of that channel, or perhaps other adjacent channels at the receiver end. The wavelengths of semiconductor laser sources used in optical WDM systems should be controlled to within a fraction of the channel spacing defined by the ITU grid.

A wavelength monitor (WM) is commonly used in conjunction with laser systems to monitor changes in the wavelength or frequency of the emitted radiation. The WM can be used as an independent device, or can be combined with a laser system forming a wavelength locker (WL) to stabilize and maintain the operational wavelength of one or more lasers by detecting the relative change in the operating wavelength, then generating a feedback signal proportional to the deviation of the working wavelength from its nominal value. The feedback signal is further used to adjust the operating wavelength until the feedback signal is reduced to an acceptable level.

Different wavelength monitoring and locking technologies have been used in the past. One type of wavelength locker is based on thin-film interference filters as disclosed in U.S. Pat. Nos. 4,309,671; 6,122,301; 6,144,025; 6,411,634. A common deficiency of a filter-based approach is that a plurality of filters are required, wherein each filter can be used for locking a relatively small number of neighboring ITU channels. To cover a broad spectral range, such as C and L telecommunication bands, a large inventory of different filters is required; this increases the cost, inventory required, and manufacturing complexity. The problem becomes even more difficult with reduction in channel spacing due to increased filter fabrication cost and complexity.

Another commonly used type of WM employs Fabry-Perot etalons and is based on multi-beam interference, as disclosed in the following U.S. Pat. Nos. 5,825,792; 6,005,995 and US Patent Application US 2003/0063871, all incorporated herein by reference. The thickness of an etalon and the refractive index of the material define the free spectral range (FSR) that corresponds to the spacing of wavelength locked channels. The etalon surface reflectivities should be controlled to achieve a required finesse that defines desired amount of wavelength discrimination.

There are several problems associated with etalon-based wavelength monitors. An etalon-based WM in a front-facet configuration usually requires a beam splitter or tap to redirect part of the output beam onto the WL. This leads to increase in cost, complexity and packaging spatial requirements of the laser system.

To achieve an etalon response function with a desired contrast, operation at a nearly normal incidence angle is required. Because the set point is positioned in the middle of the etalon amplitude modulation response curve, a significant amount of light is reflected and can potentially be coupled back to the laser source. If not rejected, that light will cause performance degradation. To reject the fed-back light, an optical isolator is positioned between the laser diode (LD) and the WL, increasing the product cost, package complexity and spatial requirements.

A third group of wavelength lockers employs wavelength-selective devices based on two-beam interference, such as a Mach-Zehnder interferometer (see for example U.S. Pat. No. 6,549,548). This type of WL has a sinusoidal spectral response and, for a given ITU channel spacing, exceeds the capture range and the contrast of the etalon-based WL counterpart. At the same time, the WL disclosed in U.S. Pat. No. 6,549,548 is based on a complex birefringent waveplate filter system that uses several components and requires precise fabrication and assembly. It also requires a beamsplitter to redirect part of the output beam onto the WL. This type of WL is expensive, complex and adds significant cost to the laser system as a whole.

It would be, therefore, desirable to provide a simple WL device that overcomes the disadvantages of the existing wavelength lockers while providing inexpensive fabrication and reduced packaging complexity.

SUMMARY OF THE INVENTION

In view of the foregoing, it is an object of the invention to provide a wavelength locker of reduced complexity that can be inexpensively fabricated in high volumes.

It is another object of the invention to provide WL device with a small amount of optical feedback so that the need for an optical isolator between the WL and laser diode (LD) is eliminated, thus reducing the package size and complexity.

While the solution presented below is concerned with a front-facet WL arrangement, it can be easily adopted to a back-facet WL configuration by those skilled in the art.

The present invention provides a WL that integrates the functions of a beam splitter and a wavelength discriminating element in a single optical component. The beam splitter function is required to redirect the fractions of the output laser beam towards the wavelength and power monitoring photodiodes (PDs). The desired wavelength selectivity is achieved by introducing an optical path difference between at least two interfering beams that reach the wavelength monitoring PD. The WL according to the present invention consists of a single optical element that employs diffraction grating and a submount with wavelength and power monitoring PDs. A fraction of the output laser beam is split by the optical element and is directed to a PD to monitor the output laser power. Another fraction of the output laser beam is split by the optical element and directed to a wavelength monitoring PD. The wavelength-monitoring portion of the beam includes at least two individual beams with introduced optical path difference required to achieve wavelength selectivity.

In accordance with the invention there is provided, a wavelength monitoring device for monitoring a beam of light, comprising:
a) a beam splitter, having opposing first and second spaced apart faces, for receiving optical radiation from the beam of light to be monitored,
  one of the first and second faces for directing a first portion of the optical radiation to a first location,
  the other of the first and second faces including an optical structure thereon or thereabout for directing:
  a second portion of the optical radiation to the first location, a third portion of optical radiation to the second location,
b) a first photodiode disposed to receive optical radiation present at the first location after the first portion and the second portion of optical radiation have optically interfered to form a composite beam, the first photodiode for detecting a wavelength characteristic of the composite beam; and,
c) a second photodiode disposed to receive the optical radiation present at the second location, wherein the third portion of optical radiation at the second location corresponds proportionally to optical power of the incident beam of light;
  wherein the first face and optical structure are oriented and spaced from one another so that the first and second portions of the optical radiation optically interfere with one another along a path toward the first photodiode. Direction of the optical beams to the above-identified locations is accomplished through reflection, refraction or diffraction, as known to those skilled in the art.

In accordance with the invention, there is further provided, a wavelength monitor for monitoring an input light beam, the monitor comprising a beam splitter having first and second spaced apart end faces, one of the end faces having an optical structure thereon for splitting a portion of the input light beam into first second and third sub-beams, wherein the third sub-beam has at least 70% of the power of the input light beam, wherein the first and second sub-beams are directed to first and second photodiodes respectively, the other of the end faces having a surface for directing a fourth portion of the input light beam incident thereupon to the first photodiode in such a manner as to direct the portion of the input light beam along at least a portion of a common path with the first sub beam so that the beams interfere with one another along a common path, wherein the interference is a function of a difference in optical path length traversed by the first sub beam and the fourth portion of the input light before the reaching the common path. Direction of the optical beams to the above-identified locations is accomplished through reflection, refraction or diffraction, as known to those skilled in the art.

The features of the invention including construction and operational details will now be more particularly described with reference to the accompanying drawings.

DESCRIPTION OF THE PREFERRED EMBODIMENTS

Figure 1:
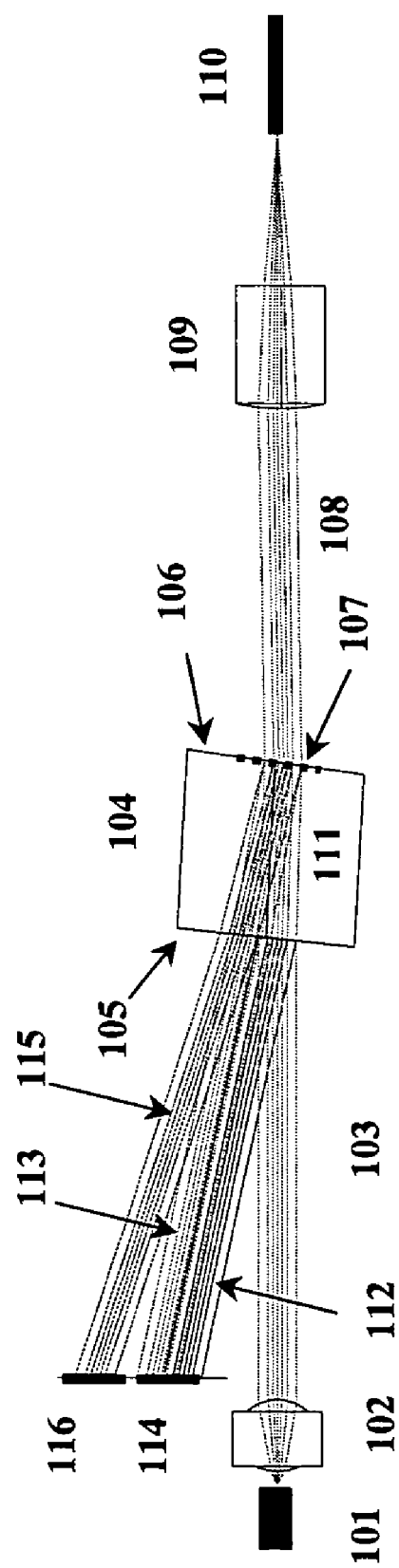
FIG. 1 is a block diagram of a laser system with WL according to the present invention.

FIG. 1 presents an optical layout of a wavelength monitor according to the present invention. A component 104 in the form of an interferometric splitter is disposed between an input waveguide 101 and an optional output optical fiber 110. The input waveguide 101 may represent an input fiber or a semiconductor laser. Photodiodes (PDs) 114 and 116 are disposed to receive light reflected from the optical component 104. A lens 102 is provided to collimate light received from the input waveguide 101 and a lens 109 is provided for focusing collimated light received into the optional output optical fiber 110.

In operation, the output from the front facet of the input waveguide 101 propagates through the lens 102 to form a collimated beam 103. The collimated beam 103 is further split into four sub-beams by the interferometric splitter 104: a collimated beam 108, a power monitoring beam 115, and wavelength monitoring beams 112 and 113. When the wavelength monitor according to the present invention is used as a front-facet wavelength monitor of a semiconductor laser, most of the power of the collimated beam 103 propagates through the interferometric splitter 104 as a collimated output beam 108 and is coupled by the focusing lens 109 into the output fiber 110. The beam 108 typically contains more than 80% of the optical power of the initial beam 103. When the WM is employed in a stand-alone configuration, the input collimating beam 103 is redistributed between the power monitoring beam 115 and the wavelength monitoring beams 112 and 113. The lenses 102 and 109 are typically aspheric in shape, but other lens types such as a ball or a GRIN lenses can also be employed for the same function. One of the wavelength monitoring beams 112 is split from the incident beam 103 by the front surface 105 of the interferometric splitter 104 is directed onto the wavelength-monitoring PD 114. The second wavelength-monitoring beam 113 is split from the beam 111 by the back surface 106 of the interferometric splitter and is also directed onto the wavelength-monitoring PD 114. The power-monitoring beam 115 is formed by splitting a portion of the incident beam 111 from the back surface 106 of the interferometric splitter 104. In alternative configurations for example in embodiments 3 through 5 which follow, the power-monitoring beam 115 is formed by splitting a portion of the incident beam 104 from the front surface 105 of the interferometric splitter 104. The power-monitoring beam 115 is directed onto the power-monitoring PD 116. The beam 113 is delayed with respect to the beam 112 by the interferometric splitter 104. Interference of the beams 112 and 113 provides wavelength-selective response of the wavelength locker as shown in the FIG. 2a for 50 GHz channel spacing.

The wavelength locking is achieved by keeping the ratio between the signals from the wavelength-monitoring PD 114 and the power-monitoring PD 116 constant.

The interferometric splitter 104 can be a wedge-shape or a plane-parallel plate, as is described in more detail below.

Figure 2A:
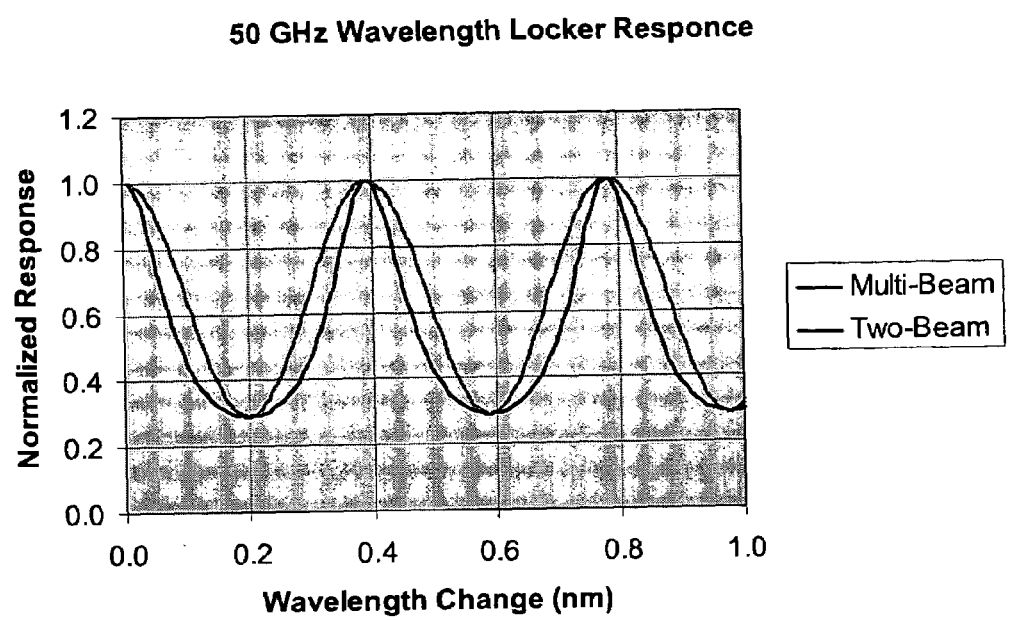
FIG. 2a is a graph of the WL normalized response and it's rate of change as a function of the wavelength.
Figure 2B:
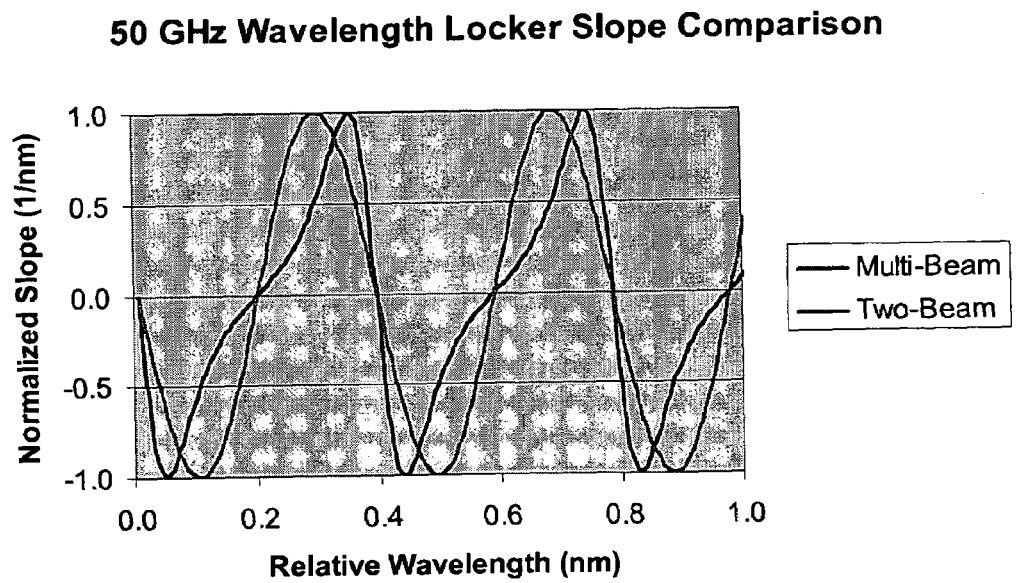
FIG. 2b is a graph of the WL slope comparison of the normalized slope as a function of wavelength.

FIG. 2*a* presents normalized response as a function of the change in LD wavelength for a multi-beam interference device, such as an etalon in accordance with the prior art, and a two-beam interference device in accordance with the present invention. Both devices have a free spectral range that corresponds to 50 GHz channel spacing. FIG. 2*b* presents respective normalized slopes or normalized response rate of change as a function of the change in the operating wavelength for devices exhibiting normalized responses shown in FIG. 2*a*.

Figure 3:
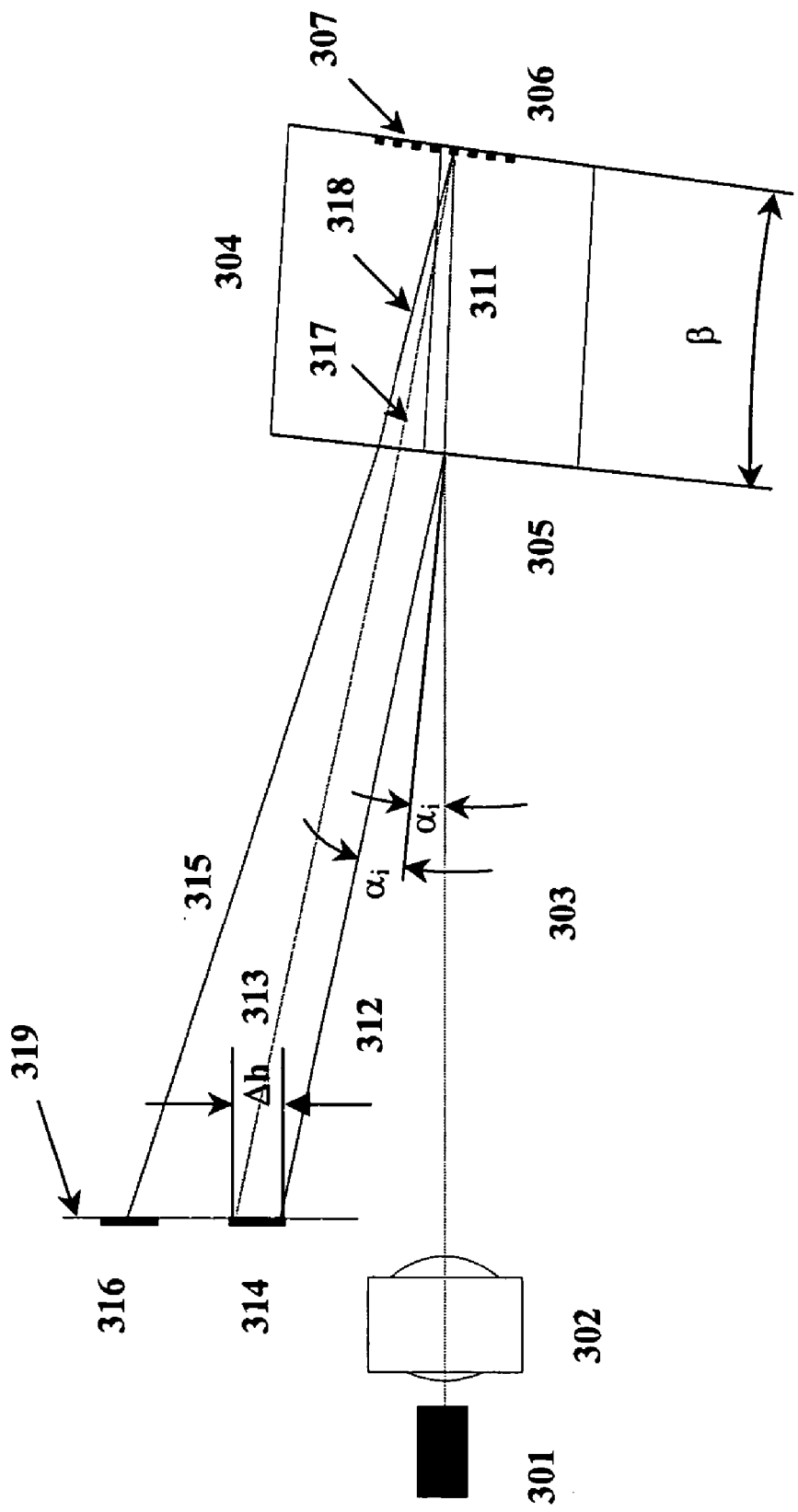
FIG. 3 is a schematic diagram of the WL in accordance with the first embodiment of the present invention wherein a single block functions as a beam splitter and an interferometer.

FIG. 3 illustrates an integrated wavelength monitor according to the first embodiment of the present invention in accordance with FIG. 1. For picture clarity, only the chief rays indicating the centers of the propagating beams are shown. The wavelength monitor comprises an interferometric splitter 304 in the shape of a wedge shaped block with a wedge angle □ shown. A diffraction grating 307 is applied to the back surface 306 of the interferometric wedge 304. An incident beam 303 collimated by the lens 302 is split into two beams 311 and 312 by the first front surface 305 of interferometric wedge 304. The beam 311 contains most of the power of beam 303 and propagates through the first surface 305 of the wedge 304 towards the back surface 306. The beam 312 is reflected by wedge surface 305 and is directed towards the wavelength monitoring PD 314. Surface 306 of the interferometric wedge 304 integrates the diffraction grating 307. The diffraction grating 307 can be fabricated, for example, as a surface relief phase grating, by etching respective groves on surface 306 of the interferometric wedge 304. The collimated beam 311 is further split into 2 beams by the surface 306: the beam 318 which is formed by a specular reflection from the surface 306, and the beam 317 which is the grating diffraction order reflected from the diffraction grating 307. The grating structure is typically optimized to reflect the first diffraction order, but other diffraction orders can be employed instead, as known to those skilled in the art. Optionally another beam (not shown) propagating through surface 306 can be created and coupled through the focusing lens into the output fiber (the beam 108 shown on FIG. 1), The beam 318 refracts through the surface 305 of the interferometric wedge 304 and emerges as a collimated beam 315 that is directed onto the power monitoring PD 316. The beam 317 refracts through the surface 305 of the interferometric wedge 304 and emerges as a collimated beam 313 that is directed onto the wavelength monitoring PD 314. The two beams 312 and 313 are laterally offset from each other at the surface of the wavelength-monitoring PD 314 by a lateral shift Δh, as shown in FIG. 3. Interference of the beams 312 and 313 occurs in free-space along the chief rays of the beams 312 and 313 and produces a wavelength-selective WL response at the active area of the wavelength-monitoring PD 314 as shown in FIG. 2*a* for a two-beam interference case.

The optical path difference between the chief rays of the interfering beams 312 and 313 can be calculated as:

$$OPD = \frac{t}{\cos(\alpha_{refr})} + \frac{t}{\cos(\alpha_{diff})} \quad (1)$$

where t is the wedge thickness at the intersection of the chief ray with the grating structure 307; $\alpha_{refr}$ is the refraction angle at the first surface 305 of the wedge 304; $\alpha_{diff}$ is the diffraction angle at the second surface 306 of the wedge 304. Accounting for the basic refraction and diffraction equations:

$$\sin(\alpha) = n \cdot \sin(\alpha_{refr}) \quad (2)$$

$$\sin(\alpha_{refr} + \beta) + \sin(\alpha_{diff}) = m \cdot \frac{\lambda}{d} \quad (3)$$

the equation (1) for the optical path difference can be re-written as:

$$OPD = \frac{t}{\sqrt{1-\left(\frac{\sin(\alpha)}{n}\right)^2}} + \frac{t}{\sqrt{1-\left(m \cdot \frac{\lambda}{d} - \sin\left(A\sin\left(\frac{\sin(\alpha)}{n}\right)+\beta\right)\right)^2}} \quad (4)$$

where α is the angle of incidence onto the first surface 305 of the wedge 304; n is the refractive index of the wedge 304 material; λ is the wavelength of the propagating light; d is the spacing between the grating groves; m is the order of diffraction; β is the angle of the wedge.

In the simplest configuration the amount of power in the beams 312, 313 and 315 is defined by Fresnel reflections at the air-glass interfaces of the uncoated surfaces 305 and 306 of the WL component 304. The surfaces 305 and 306 may optionally include coatings for equalization of the power levels in the beams 312 and 313 to increase the contrast of the spectrally modulated interferometric response, as well as to balance the response levels of the monitoring photodiodes 314 and 316. Because the beams 312 and 313 have lateral offset Δh, the highest modulation contrast is achieved when the center of the wavelength monitoring PD is located at the mid-point between the beam centers. In the preferred embodiment, the power-monitoring PD 316 and the wavelength-monitoring PD 314 are mounted on a common substrate 319, shown schematically in FIG. 3. The wavelength change is monitored independently from the changes in the power of the input beam 303: the output signal from the wavelength-monitoring PD 314 is normalized by dividing it by the output signal of the power-monitoring PD 316. The wavelength-monitoring PD 314 and the power-monitoring PD 316 are located on a same side from the collimated beam 303.

Figure 4:
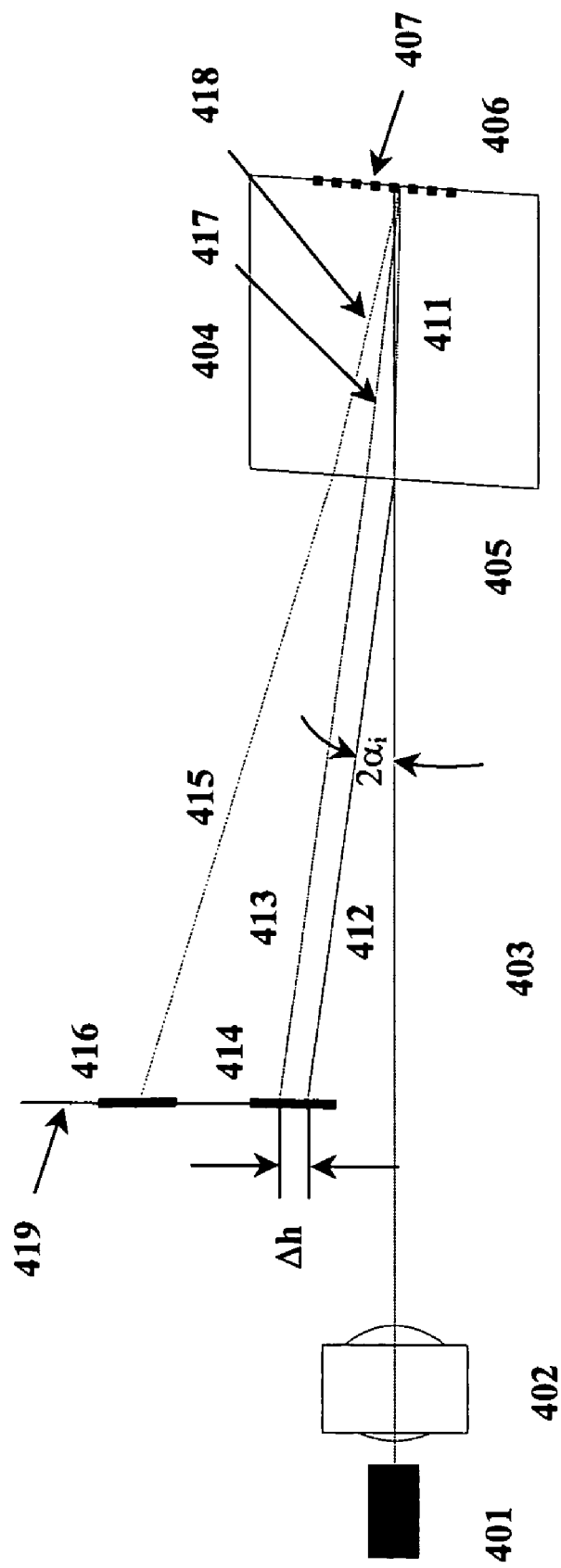
FIG. 4 is a schematic diagram of the WL in accordance with the second embodiment of the present invention.

FIG. 4 presents the integrated wavelength monitor according to the second embodiment of the present invention. According to the second embodiment, the WM component 404 comprises two plane-parallel surfaces 405 and 406 with diffraction grating 407 fabricated on the rear surface 406. According to the second embodiment, the output from the waveguide 401 propagates through a lens 402 that forms a collimated beam 403. The collimated beam 403 is further split into several individual beams by the interferometric WL component 404. At least three sub-beams are formed by interferometric plane-parallel plate 404: the main beam which contains most of the power of beam 403 propagates through the WL component 404 and is coupled into the output fiber (not shown in the Figure), a power monitoring beam 415 and wavelength monitoring beams 412 and 413. The collimated beam 403 is split into two beams 411 and 412 by the first surface 405 of the interferometric plate 404. The beam 411 typically contains most of the power of the beam 403 and propagates through the first surface 405 of the plate 404 towards the second surface 406. The beam 412 is reflected by the plate surface 405 and is directed towards the wavelength monitoring PD 414. The surface 406 of the interferometric plate 404 contains a grating 407. The grating 407 can be fabricated as a surface relief phase grating by, for example, etching groves on the surface 406 of the interferometric plate 404. The collimated beam 411 is split into at least two beams by the surface 406: the beam 417 which is formed by a specular reflection from the surface 406, and the beam 418 which is formed by diffraction in reflection from the grating structure 407. The grating structure is typically optimized to reflect the first diffraction order, but other diffraction orders can be employed instead, as known to those skilled in the art. Optionally the pass-through beam (beam 108 shown in FIG. 1) is also formed on the surface 406 and is coupled into the output fiber through the focusing lens. The beam 417 emerges from the interferometric plate 404 after refraction on the surface 405 as a collimated beam 413 that is directed onto the wavelength-monitoring PD 414. The beam 418 emerges from the interferometric plate 404 after refraction on the surface 405 as a collimated beam 415 that is directed onto the power-monitoring PD 416.

The optical path difference between the chief rays of the interfering beams 412 and 413 in accordance with the second embodiment can be calculated as:

$$OPD = \frac{2 \cdot t}{\sqrt{1 - \left(\frac{\sin(\alpha)}{n}\right)^2}} \quad (5)$$

where t is the plate 404 thickness; α is the angle of incidence onto the first surface of the plate 404; n is the refractive index of the plate 404 material at the working wavelength λ of the propagating light.

In the simplest configuration the amount of power in the beams 412, 413 and 415 is defined by Fresnel reflections at the air-glass interfaces of the uncoated surfaces 405 and 406 of the WL component 404. The surfaces 405 and 406 may optionally include coatings for equalization of the power levels in beams 412 and 413 to maximize the contrast of the spectrally modulated interferometric response, as well as to balance the response levels of the monitoring photodiodes 414 and 416. Because the beams 412 and 413 have lateral offset Δh, the highest modulation contrast is achieved when the center of the wavelength monitoring PD is located at the mid-point between the beam centers. In the preferred embodiment, the power-monitoring PD 416 and the wavelength monitoring PD 414 are mounted on a common substrate 419, shown schematically in FIG. 4. The wavelength change is monitored independently from the changes in the power of the input beam 403: the output signal from the wavelength-monitoring PD 414 is normalized by dividing it by the output signal of the power-monitoring PD 416. The wavelength-monitoring PD 414 and the power-monitoring PD 416 are located on the same side from the collimated beam 403.

Figure 5:
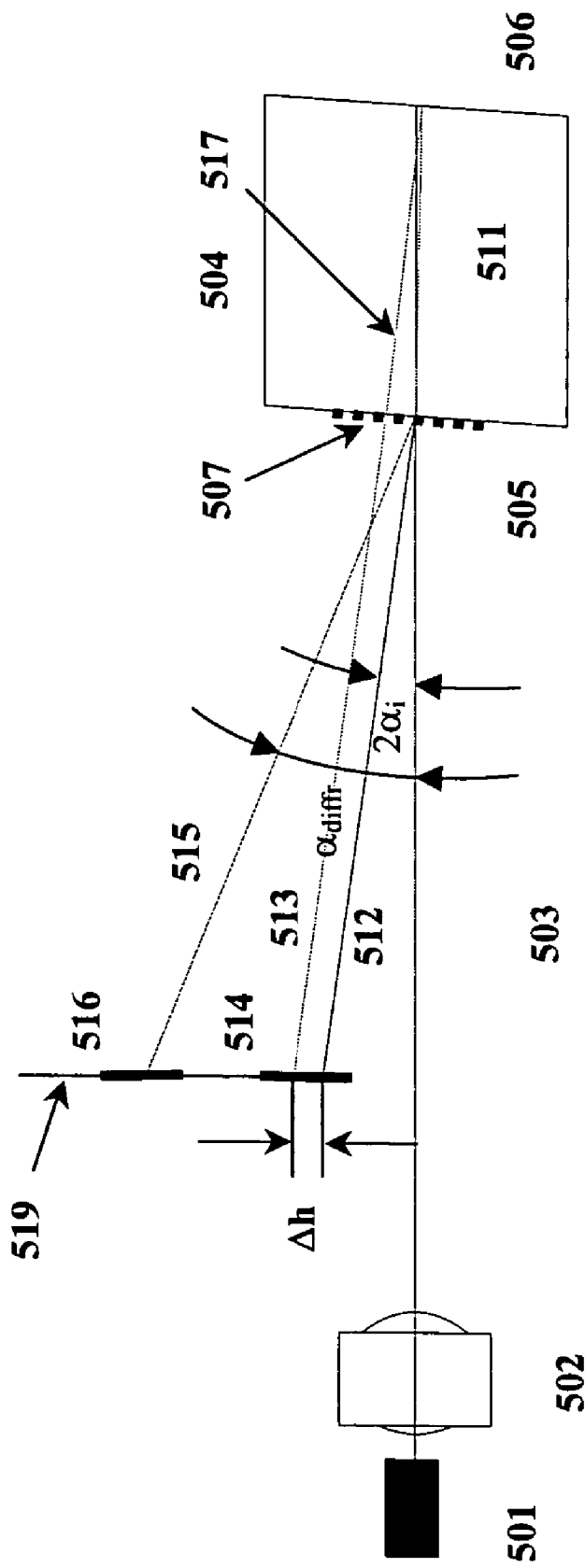
FIG. 5 is a schematic diagram of the WL in accordance with the third embodiment of the present invention.

FIG. 5 illustrates the integrated wavelength monitor according to the third embodiment of the present invention. According to the third embodiment, the WM is constructed so that the grating 507 is fabricated on the front surface 505 of the WM interferometric splitter 504 in the shape of a plane-parallel plate. According to the third embodiment, the output from the input waveguide 501 propagates through a lens 502 that forms a collimated beam 503. The collimated beam 503 is incident onto the first surface 505 of the plate 504 containing diffraction grating 507, where it is split into at least three individual beams 511 and 512 and 515. The beam 511 is formed through refraction of the beam 503 through the front surface 505 of the interferometric splitter 504 and propagates from the first surface 505 of the plate 504 towards the second surface 506. The beam 512 is formed by specular reflection of the beam 503 from the surface 505 and is directed onto the wavelength-monitoring PD 514. The beam 515 is formed as a diffraction order in reflection of the beam 503 from the grating 507, and is directed onto the power-monitoring PD 516. The grating structure is typically optimized to reflect the first diffraction order, but other diffraction orders can be employed instead, as known to those skilled in the art. The beam 511 is reflected from the plate surface 506 and is directed towards the front surface 505 as a beam 517. The beam 513 is formed by refracting the beam 517 through the front surface 505, and is directed onto the wavelength-monitoring PD 514. The beams 512 and 513 interfere at the surface of the wavelength-monitoring PD 514, providing required wavelength selectivity of the WL. The optical path difference between the chief rays of the interfering beams 512 and 513 can be calculated using equation (5). The wavelength-monitoring PD 514 and the power-monitoring PD 516 are located on the same side from the collimated beam 503. In an alternative fourth embodiment the beam 511 is split into two beams at the surface 506. One beam, corresponding to the beam 108 in FIG. 1 (not shown in FIG. 5), contains majority of the power of the incident beam 511, propagates through the surface 506 and is coupled into the output fiber through a focusing lens. The second beam 517 is formed by reflecting a portion of the beam 511 from the plate surface 506 and is directed towards the front surface 505. The beam 513 is formed by refracting the beam 517 through the front surface 505, and is directed onto the wavelength-monitoring PD 514. The beams 512 and 513 interfere at the surface of the wavelength-monitoring PD 514, providing required wavelength selectivity of the WL. The optical path difference between the chief rays of the interfering beams 512 and 513 can be calculated using equation (5). The wavelength-monitoring PD 514 and the power-monitoring PD 516 are located on the same side from the collimated beam 503.

Figure 6:
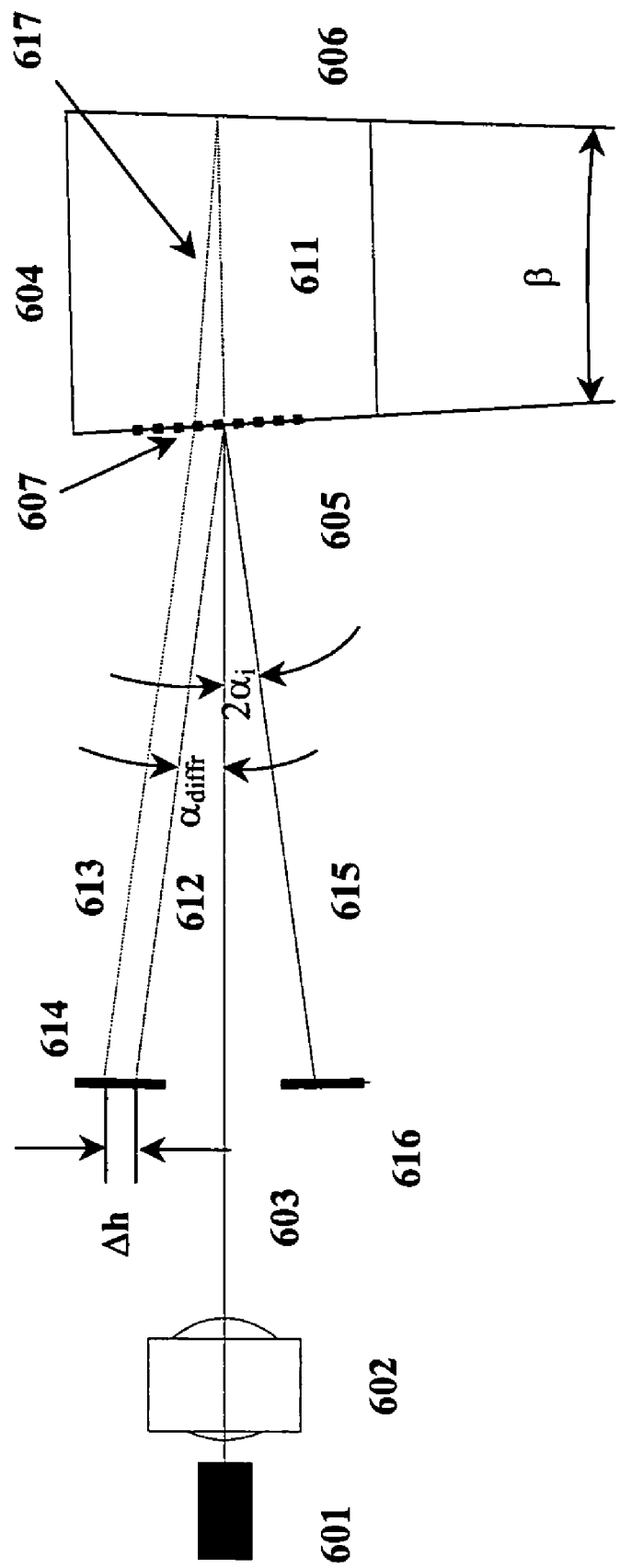
FIG. 6 is a schematic diagram of the WL in accordance with the fourth embodiment of the present invention

FIG. 6 illustrates the integrated wavelength locker in accordance with a fifth embodiment of the present invention, where the interferometric splitter 604 of the WL is constructed as a wedge with diffraction grating 607 fabricated on the front surface 605 of it. According to the fifth embodiment, the output from the waveguide 601 propagates through a lens 602 that forms a collimated beam 603. The collimated beam 603 is incident onto the first surface 605 of the plate 604 containing diffraction grating 607, where it is split into at least three individual beams 611 and 612 and 615. The beam 611 contains most of the power of the beam 603, refracts through the first surface 605 of the plate 604 and propagates towards the second surface 606. The beam 615 is formed by specular reflection of the beam 603 from the surface 605 and is directed onto the power-monitoring PD 616. The beam 612 is formed as a diffraction order in reflection of the beam 603 from the grating 607, and is directed onto the wavelength-monitoring PD 614. The grating structure is typically optimized to reflect the first diffraction order, but other diffraction orders can be employed instead, as known to those skilled in the art. The beam 611 is reflected from the wedge surface 606 as a beam 617 and is directed towards the first surface 605. The beam 613 is continuation of the beam 617 after refraction through the surface 605, is directed onto the wavelength-monitoring PD 614. The beams 612 and 613 interfere at the surface of the wavelength-monitoring PD 614, providing required wavelength selectivity to the WM. The optical path difference between the chief rays of the interfering beams 612 and 613 is defined by equation (4). The wavelength-monitoring PD 614 and the power-monitoring PD 616 are located on the opposite sides from the collimated beam 603.

In an alternative sixth embodiment the beam 611 is split into two beams at the back surface 606. One beam, corresponding to the beam 108 in FIG. 1 (not shown in FIG. 6), contains majority of the power of the incident beam 611, propagates through the surface 606 and is coupled into the output fiber through a focusing lens. The second beam 617 is reflected from the wedge surface 606 and is directed towards the first surface 605. The beam 613 is continuation of the beam 617 after refraction through the surface 605, is directed onto the wavelength-monitoring PD 614. The beams 612 and 613 interfere at the surface of the wavelength-monitoring PD 614, providing required wavelength selectivity to the WM. The optical path difference between the chief rays of the interfering beams 612 and 613 is defined by equation (4). The wavelength-monitoring PD 614 and the power-monitoring PD 616 are located on the opposite sides from the collimated beam 603.

Figure 7:
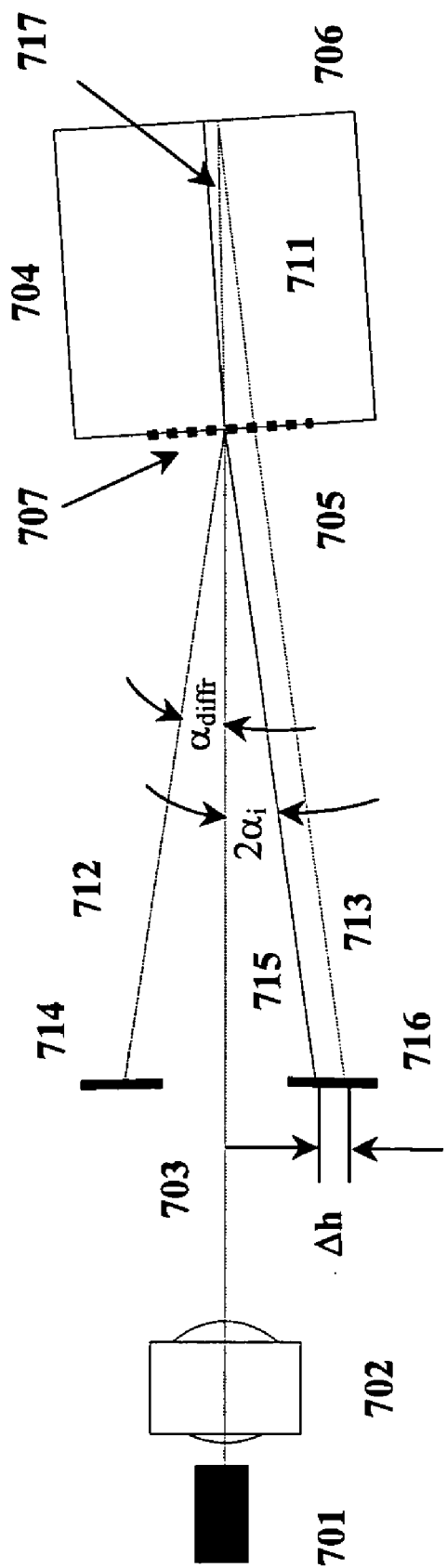
FIG. 7 is a schematic diagram of the WL in accordance with the fifth embodiment of the present invention

FIG. 7 illustrates the integrated wavelength locker according to a seventh embodiment of the present invention. According to the seventh embodiment, the WL is constructed so that the grating 707 is fabricated on the front surface 705 of the interferometric splitter 704 in the shape of a plane-parallel plate. According to the embodiment, the output from the input waveguide 701 propagates through a lens 702 that forms a collimated beam 703. The collimated beam 703 is incident onto the first surface 705 of the plate 704 containing diffraction grating 707, where it is split into at least three individual beams 711 and 712 and 715. The beam 711 is defined by refraction of the beam 703 through the surface 705 and propagates towards the second surface 706. The beam 715 is formed by specular reflection of the beam 703 from the front surface 705 and is directed onto the wavelength-monitoring PD 716. The beam 712 is formed as a diffraction order in reflection of the beam 703 from the grating 707, and is directed onto the power-monitoring PD 714. The grating structure is typically optimized to reflect the first diffraction order, but other diffraction orders can be employed instead, as known to those skilled in the art. The beam 711 is reflected from the plate surface 706 as a beam 717 and is directed towards the first surface 705. The beam 713 is a continuation of the beam 717 after refraction through the surface 705, is directed onto the wavelength-monitoring PD 714. The beams 712 and 713 interfere at the active area of the wavelength-monitoring PD 614, providing required wavelength selectivity to the WM. The optical path difference between the chief rays of the interfering beams 712 and 713 is defined by equation (5). The wavelength-monitoring PD 714 and the power-monitoring PD 716 are located on the opposite sides from the collimated beam 703. In an alternative eighth embodiment the beam 711 is further split into two beams at the surface 706. One beam, corresponding to the beam 108 in FIG. 1 (not shown in FIG. 7), contains majority of the power of the incident beam 711, propagates through the surface 706 and is coupled into the output fiber through a focusing lens. The second beam 717 is defined by reflection of the beam 711 from the plate back surface 706 and is directed towards the first surface 705. The beam 713 formed by refraction of the beam 717 through the surface 705, is directed onto the wavelength-monitoring PD 716. The beams 712 and 713 interfere at the surface of the wavelength-monitoring PD 716, providing wavelength selectivity to the WL. The optical path difference between the chief rays of the interfering beams 712 and 713 is defined using equation (5). The wavelength-monitoring PD 716 and the power-monitoring PD 714 are located on the opposite sides from the collimated beam 703.

While this invention has been particularly shown and described with references to preferred embodiments thereof, it will be understood by those skilled in the art that several other variances of the presented WM design can be constructed without departing from the scope of the invention. For example, although the embodiments shown are directed to having an incident beam split into three beams that are reflected and a fourth optional beam that is transmitted through the block, it is possible to have the transmitted beam reflected as well, to a distinct location where it may be coupled into an optical waveguide. Alternatively, although not shown, the invention may work in transmission, where all or some of the output ports, including monitoring PDs, are disposed on the opposite side with respect to the input beam.

Nowithstanding, the diffractive grating would have to transmit the beams it is currently shown to reflect to distinct locations, wherein two beam have an overlapping path. This could be done by having one of the beams bounce once prior to being transmitted to ensure an optical path length difference between the two beams that propagate and mix in freespace prior to being incident upon the detector. In yet another less preferred embodiment, the block could be replaced with two faces or surfaces of two transmissive substrates having a gap there between. These two spaced apart faces would function in a less efficient and less convenient manner than the preferred and described block.

The term block used in this specification is to include a wedge or block having multiple sides, which may or may not be parallel.

What is claimed is:

1. A wavelength monitoring device for monitoring a beam of light, comprising:

a) a beam splitter, having opposing first and second spaced apart faces, for receiving optical radiation from the beam of light to be monitored,
   one of the first and second faces for reflecting a first portion of the optical radiation to a first location,
   the other of the first and second faces including an optical structure thereon or thereabout for reflecting:
   a second portion of the optical radiation to the first location, a third portion of optical radiation to the second location, b) a first photodiode disposed to receive optical radiation present at the first location after the first portion and the second portion of optical radiation have optically interfered to form a composite beam, the first photodiode for detecting a wavelength characteristic of the composite beam; and, c) a second photodiode disposed to receive the optical radiation present at the second location, wherein the third portion of optical radiation at the second location corresponds proportionally to optical power of the incident beam of light;
   wherein the first face and optical structure are oriented and spaced from one another so that the first and second portions of the optical radiation optically interfere with one another along a path toward the first photodiode.

2. A wavelength monitoring device as defined in claim 1 wherein the beam splitter is a block of light transmissive material and wherein the block is a wedge shaped block and wherein the first and second faces are not parallel.

3. A wavelength monitoring device as defined in claim 1 wherein the beam splitter is a block of light transmissive material and wherein the first and second faces spaced apart faces are faces of the block which are parallel.

4. A wavelength monitoring device as defined in claim 1, wherein the beam splitter is a block of light transmissive material, said wavelength monitoring device further comprising a source of radiation for providing the light beam to be monitored, and wherein the first and second photodiodes are disposed on a same side of the block as the source of radiation, facing an input end face of the block.

5. A wavelength monitoring device as defined in claim 4 wherein the output location is facing an output end face of the block and is on an opposite side of the block from the photodiodes.

6. A wavelength monitoring device as defined in claim 4 wherein the optical structure is a diffraction grating formed on a face of the block.

7. A wavelength monitor as defined in claim 6 further comprising control circuitry for comparing the relative detected intensities at the photodiodes and for providing a control signal in dependence upon the detected intensities for providing feedback to control the source of radiation.

8. A wavelength monitor as defined in claim 6 wherein the two photodiodes are formed on a same substrate.

9. A wavelength monitoring device as defined in claim 1 wherein
the other of the first and second faces including an optical structure thereon is at least partially transmissive for transmitting:
a fourth most substantial portion of the optical radiation to an output location.

10. A wavelength monitoring device as defined in claim 1, wherein the beam splitter is a block of light transmissive material, said wavelength monitoring device further comprising a source of radiation for providing the light beam to be monitored, and wherein the first and second photodiodes are disposed on a same side of the block as the source of radiation, facing an input end face of the block, and wherein the two photodiodes are on a same side of the light beam to be monitored.

11. A wavelength monitoring device as defined in claim 1, wherein the beam splitter is a block of light transmissive material, said wavelength monitoring device further comprising a source of radiation for providing the light beam to be monitored, and wherein the first and second photodiodes are disposed on a same side of the block as the source of radiation, facing an input end face of the block, and wherein the two photodiodes are disposed on a different sides of the light beam to be monitored.

12. A wavelength monitor for monitoring an input light beam, the monitor comprising a beam splitter having first and second spaced apart end faces, one of the end faces having an optical structure thereon for splitting a portion of the input light beam into first second and third sub-beams, wherein the third sub-beam has at least 70% of the power of the input light beam, wherein the first and second sub-beams are directed to first and second photodiodes respectively, the other of the end faces having a surface for directing a fourth portion of the input light beam incident thereupon to the first photodiode in such a manner as to direct the portion of the input light beam along at least a portion of a common path with the first sub beam so that the beams interfere with one another along a common path, wherein the interference is a function of a difference in optical path length traversed by the first sub beam and the fourth portion of the input light before the reaching the common path.

13. A wavelength monitor as defined in claim 12, wherein the beam splitter comprises a block of light transmissive material and wherein the first and second spaced apart end faces are opposing end faces of the block.

14. A wavelength monitor as defined in claim 13, wherein one of the end faces of the block includes a diffraction grating.

15. A wavelength monitor as defined in claim 12, wherein the first and fourth sub beams are reflected from two different faces of the block to effect an optical path length difference between the first and fourth sub beams incident upon the first photodiode.

16. A wavelength monitor as defined in claim 15, wherein the monitor is a wavelength locker and wherein the third beam is transmitted through the block.

17. A wavelength monitor as defined in claim 15, wherein one of the first and second faces of the block includes a diffraction grating for diffracting a portion of the beam incident thereon into the first and second sub beams.

18. A wavelength monitor as defined in claim 17 including a laser light source for generating the input beam of light.

19. A wavelength monitor as defined in claim 18, wherein the laser light source, and the two photodiodes are on a same side of the block facing one of the first and second space apart end faces of the block.

* * * * *